United States Patent
Kim

(10) Patent No.: US 7,925,020 B2
(45) Date of Patent: Apr. 12, 2011

(54) APPARATUSES AND METHODS FOR COPY PROTECTION

(75) Inventor: In Moon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1209 days.

(21) Appl. No.: 11/471,614

(22) Filed: Jun. 21, 2006

(65) Prior Publication Data

US 2007/0143862 A1      Jun. 21, 2007

(30) Foreign Application Priority Data

Dec. 16, 2005   (KR) .................. 10-2005-0124633

(51) Int. Cl.
   H04N 7/167       (2006.01)
   H04N 7/16        (2006.01)
(52) U.S. Cl. ........................... 380/210; 726/31
(58) Field of Classification Search .......... 380/44, 380/46, 200, 201, 203, 210; 725/31; 726/31
   See application file for complete search history.

(56) References Cited

U.S. PATENT DOCUMENTS

| | | | | |
|---|---|---|---|---|
| 6,463,152 B1 * | 10/2002 | Takahashi | ............... | 380/201 |
| 7,225,339 B2 * | 5/2007 | Asano et al. | ............... | 713/193 |
| 7,386,128 B2 * | 6/2008 | Moroney | ............... | 380/210 |
| 2002/0146125 A1 * | 10/2002 | Eskicioglu et al. | ........... | 380/255 |
| 2002/0150248 A1 * | 10/2002 | Kovacevic | ............... | 380/210 |
| 2004/0105549 A1 | 6/2004 | Suzuki et al. | | |
| 2004/0252973 A1 * | 12/2004 | Kim et al. | ............... | 386/94 |
| 2005/0089162 A1 * | 4/2005 | Kobayashi | ............... | 380/44 |
| 2005/0152553 A1 | 7/2005 | Kosugi et al. | | |
| 2007/0223691 A1 * | 9/2007 | Takashima et al. | ........... | 380/200 |
| 2007/0258587 A1 * | 11/2007 | Harada et al. | ............... | 380/201 |
| 2007/0261076 A1 * | 11/2007 | Puputti | ............... | 725/25 |

OTHER PUBLICATIONS

Cablelabs: "CableCARD Copy Protection 2.0 Specification" OpenCable Specifications, Mar. 31, 2005, pp. 1-63, XP002601113.

* cited by examiner

Primary Examiner — William R Korzuch
Assistant Examiner — Elliott Akporherhe
(74) Attorney, Agent, or Firm — McKenna Long & Aldridge LLP

(57) ABSTRACT

Apparatuses and methods may include creating at least one of a scramble key and a descramble key using a Copy Protection (CP) key that existed prior to a refresh period and using a value created at a time associated with the changing of a channel during the refresh period, and using the at least one of the scramble key and the descrambled key until the CP key is refreshed at an end of the refresh period.

11 Claims, 8 Drawing Sheets

APPARATUSES AND METHODS FOR COPY PROTECTION

This application claims the benefit of the Korean Patent Application No. 10-2005-0124633, filed on Dec. 16, 2005, which is hereby incorporated by reference as if fully set forth herein.

BACKGROUND

1. Field of the Disclosure

The present disclosure relates to apparatuses and methods for copy protection, and more particularly, to apparatuses and methods for copy protection of contents broadcasted using content broadcast technology.

2. Background

Presently, various digitally transmitted broadcast are being developed because contents can be displayed with high definition and clarity. In the U.S.A., the next generation television adopted to receive digitally transmitted contents is known as the ATV (advanced television). In Europe, digitally transmitted broadcast or digital broadcasting is being developed under various projects such as HD DIVINE in Sweden, SPECTRE in U.K., DIAMOND in France, etc. Additionally, efforts are being made by various countries to develop digital broadcasting to interoperate with B-ISDN or computer networks.

Protection of broadcast contents is a major concern. In order to allow various digital broadcast contents to be viewed by approved users, a host, such as a digital broadcast receiver may use a conditional access device. A protection method is now described.

A broadcasting station scrambles digital broadcast contents with a secret key and then broadcasts the scrambled digital contents through a wired (e.g., cable or telephone) or wireless (e.g., satellite) network. A digital broadcast receiver receives the digital broadcast contents and forwards them to a conditional access device. The conditional access device descrambles the scrambled digital broadcast contents using the secret key for an approved user, and thereby allowing the user to view the digital broadcast contents.

In the case of a cable broadcasting network, a cable broadcasting station transmits a cable broadcast and a cable broadcast receiver receives the transmitted cable broadcast. The cable broadcasting station is usually referred to as a system operator (SO) head end, which is usually a local cable broadcast provider, or a multiple system operator (MSO), which is basically several SOs grouped together.

The cable broadcast receiver, which may be an OpenCable Digital TV or a CableReady Digital TV, etc., may employ an Open Cable Application Platform (OCAP) standard, and may use a cable card or a point of deployment (POD) module, which is inserted in a slot located at the cable broadcast receiver. The cable card may use Personal Computer Memory Card International Association (PCMCIA) standard in order to interface with the cable broadcast receiver. The cable card may function as a security module and may include a conditional access (CA) system for controlling access to contents by the user. Alternatively, the cable broadcast receiver may have a built-in module that is a functional equivalent of the cable card, in which case, the cable broadcast receiver may not require a separate cable card. The conditional access system ensures that various contents provided by the broadcasting station are being paid or are prevented from being copied, for example. As such, scrambling and descrambling operations may occur between the security module and the cable broadcast receiver.

SUMMARY

The Open Cable Application Platform (OCAP) standard currently proposes a scrambling key and a de-scrambling key generating method that fails to address certain situations that occur during scrambling and descrambling operations at the security module and the cable broadcast receiver. For instance, during a key refresh, situations may occur where the scrambling key and/or the descrambling key may change based on different criteria, and thus contents scrambled with the scrambling key may not be descrambled with the descrambling key.

Accordingly, apparatuses and methods for preventing inconsistencies between the scrambling key and the descrambling key are highly desirable.

The disclosure may disclose apparatuses and methods where the scrambling key and the descrambling key are identical.

The disclosure may disclose apparatus and methods for copy protection in which scramble and de-scramble factors according to a refresh of a copy restricting key and a channel switching are synchronized.

Advantages, objects, and features of the invention in part may be apparent in the description which follows and in part may become apparent to those having ordinary skill in the art upon examination of the following or may be learned from practice of the invention. The objectives and other advantages of the various embodiments of the invention may be realized and attained by the structures and processes described in the written description, in the claims, and in the appended drawings.

To achieve these objects and other advantages and in accordance with the purpose of the invention, as embodied and broadly described herein, a method includes the steps of creating at least one of a scramble key and a descramble key using a Copy Protection (CP) key that existed prior to a refresh period and using a value created at a time associated with the changing of a channel during the refresh period, and using the at least one of the scramble key and the descrambled key until the CP key is refreshed at an end of the refresh period.

In another aspect, an apparatus includes a controller configured to create at least one of a scramble key and a descramble key using a Copy Protection (CP) key that existed prior to a refresh period and a value created at a time associated with the changing of a channel during the refresh period, and the controller further configured to use the at least one of the scramble key and the descrambled key until the CP key is refreshed at an end of the refresh period.

In another aspect, a method includes the steps of creating at least one of a scramble key and a descramble key using a Copy Protection (CP) key that existed prior to a refresh period and a value that existed prior to changing a channel, and using the at least one of the scramble key and the descrambled key until the CP key is refreshed at an end of the refresh period.

In another aspect, a apparatus includes a controller configured to create at least one of a scramble key and a descramble key using a Copy Protection (CP) key that existed prior to a refresh period and a value that existed prior to changing a channel, and the controller further configured to use the at least one of the scramble key and the descrambled key until the CP key is refreshed at an end of the refresh period.

In another aspect, a method includes the steps of creating at least one of a scramble key and a descramble key using a Copy Protection (CP) key that existed prior to a refresh period and a value that existed prior to changing a channel, and preventing the use of any one of a scramble key and a descramble key if the existed value changes due to the change of the channel during the refresh period.

In yet another aspect, a apparatus includes a controller configured to create at least one of a scramble key and a descramble key using a Copy Protection (CP) key that existed prior to a refresh period and a value that existed prior to changing a channel, and the controller further configured to prevent the use of any one of a scramble key and a descramble key if the existing value changes due to the change of channel during the refresh period.

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the disclosure, are incorporated herein and constitute a part of this application. The drawings together with the written description serve to explain one or more embodiment(s) of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts for simplicity.

Figure 1:
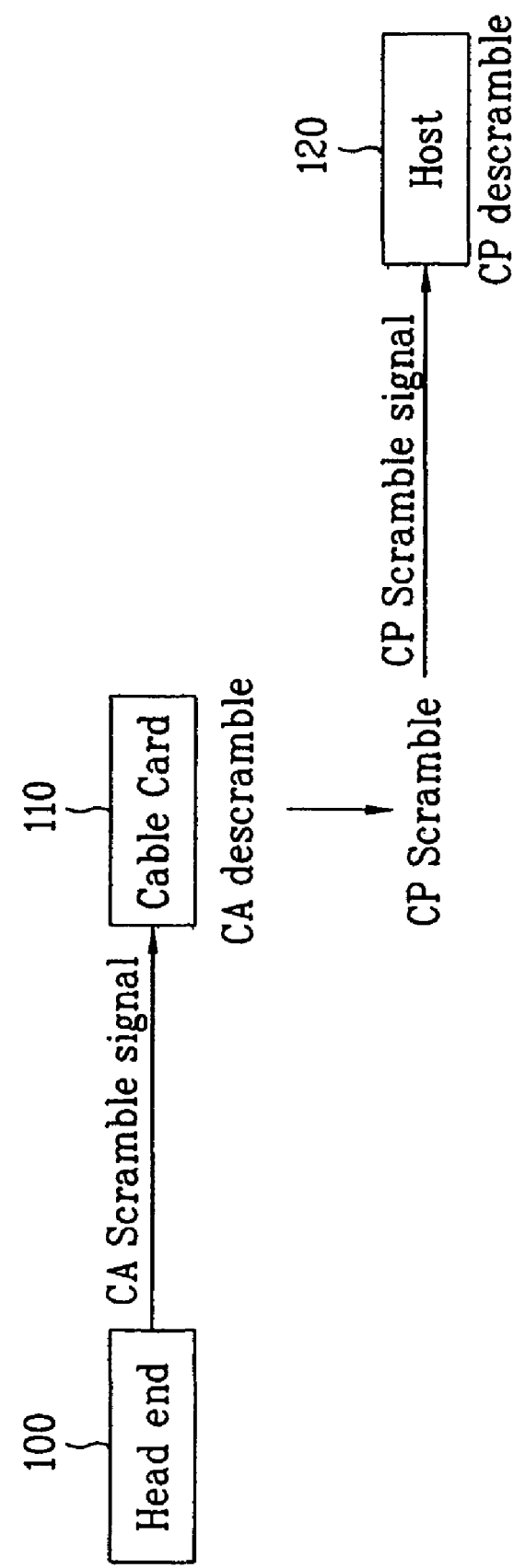
FIG. 1 is a block diagram of an exemplary broadcast system according to one embodiment of the present invention.

FIG. 1 is a schematic block diagram of an exemplary broadcast system according to one embodiment of the present invention. Referring to FIG. 1, the broadcast system includes a head end 100, a cable card 110 and a host 120. The head end 100 may be a broadcasting station, which may be an SO head end or an MSO head end. The cable card 110 may include a conditional access system (CAS). In another embodiment, CAS may be software that is downloaded from the head end by the host and stored in its memory. The downloaded software is usually referred to as a download conditional access system (DCAS). In yet another embodiment, CAS is provided in the cable card and DCAS is downloaded to the host, where the CAS and DCAS are selectively used.

In the embodiment of FIG. 1, however, the cable card 110 includes CAS, which is used to descramble scrambled contents broadcasted by the head end 100. CAS then rescrambles the descrambled contents for conditional access between the cable card 110 and the host 120.

If authorized, the host 120 descrambles the contents received from the cable card 110 and then displays the contents. It should be appreciated that a host includes a cable broadcast receiver that includes a built-in module having a functional equivalent of the cable card, or the host includes a cable broadcast receiver that does not require a cable card, but uses a downloaded DCAS for access to contents.

In this embodiment, however, the host 120 is configured to use a cable card 110 and the cable card 110 is inserted in the host 120. In particular, a slot is provided in the host 120 to receive and interface with the cable card 110. With the cable card 110 inserted, the cable card 110 and the host 120 perform a mutual authentication process.

Specifically, the cable card 110 performs an authentication process to check whether the host 120 is valid prior to providing contents to the host 120. For example, during the authentication initiation process, a public key of the cable card 110 and a signature of a card certificate are created based on a card manufacturer certificate including a card manufacturer identifier and the card certificate including a card identifier, which form at least a part of the cable card 110's authentication information and are stored in the cable card 110.

At the host 120, a public key of the host and a signature of a host certificate are created based on a host manufacturer certificate including a host manufacturer identifier and the host certificate including a host identifier, which form at least a part of the host 120's authentication information and are stored in the host 120.

Part of the authentication process involves a creation of a copy protection (CP) key(s), which is now described.

When the cable card 110 is inserted in the host 120, the respective authentication information of the cable card 110 and the host 120 are exchanged between the two in order to verify whether the respective authentication information is valid. Specifically, the cable card 110 transmits its authentication information that includes the card certificate, the card manufacturer certificate, the signature of the card certificate and the public key of the card to the host 120.

The host 120 then determines whether the cable card 110 is valid based on the authentication information of the cable card 110. If the host 120 determines the cable card 110 to be valid, then the host 120 transmits its authentication information to the cable card 110. Using the host 120's authentication information, the cable card 110 determines whether the host 120 is valid. If the host 120 is valid, then the cable card 110 creates an authentication key of the cable card 110 using the host 120's authentication information. The cable card 110 may receive an authentication key from the host 120 and determine whether the authentication key of the cable card 110 matches the received authentication key of the host 120. If there is a match, at least one of the card identifier, the host identifier and the head end information may be displayed.

When the authentication key of the cable card 110 matches the authentication key of the host 120, at least one of the cable card 110 and the host 120 creates a copy protection (CP) key. If both the cable card 110 and the host 120 create the CP key, the created CP keys may have the same value. The cable card 110 and the broadcast receiver 120 may then use their respective created CP key to scramble and/or descramble contents transmitted from the head end 100.

The head end 100 scrambles a content transmitted with a broadcast signal with a secret key for conditional access and transmits the secret key to the broadcast receiver 120. The cable card 110, within the host 120, descrambles the transmitted scrambled content using the secret key. The cable card 110 then re-scrambles the descrambled content using a scramble key, which may be different from the secret key.

For example, the cable card 110 may use a data encryption standard (DES) key as the scramble key. The content scrambled by the cable card 110 is forwarded to the host 120.

If the content is multi-stream, the cable card 110 may create three DES keys (i.e., TDES key), scramble the content according to an TDES algorithm using the three DES keys and then forwards the scrambled content to the host 120. In this case, the DES key is created using the created CP key created by the cable card 110, and entitlement control message (ECM) packet identifier (PID) and local transport stream ID (LTSID) included in the content.

For 3-step scrambles and 3-step descrambles, three DES keys should be created. However, two DES keys are normally created because the same DES key may be used in the 1st step and 3rd step scrambles and descrambles.

The host 120 may descramble the scrambled content from the cable card 110 based on the TDES algorithm using two DES keys.

The TDES keys created by the cable card 110 and the host 120 are created using the created CP key, and thereby may have the same value.

Figure 2:
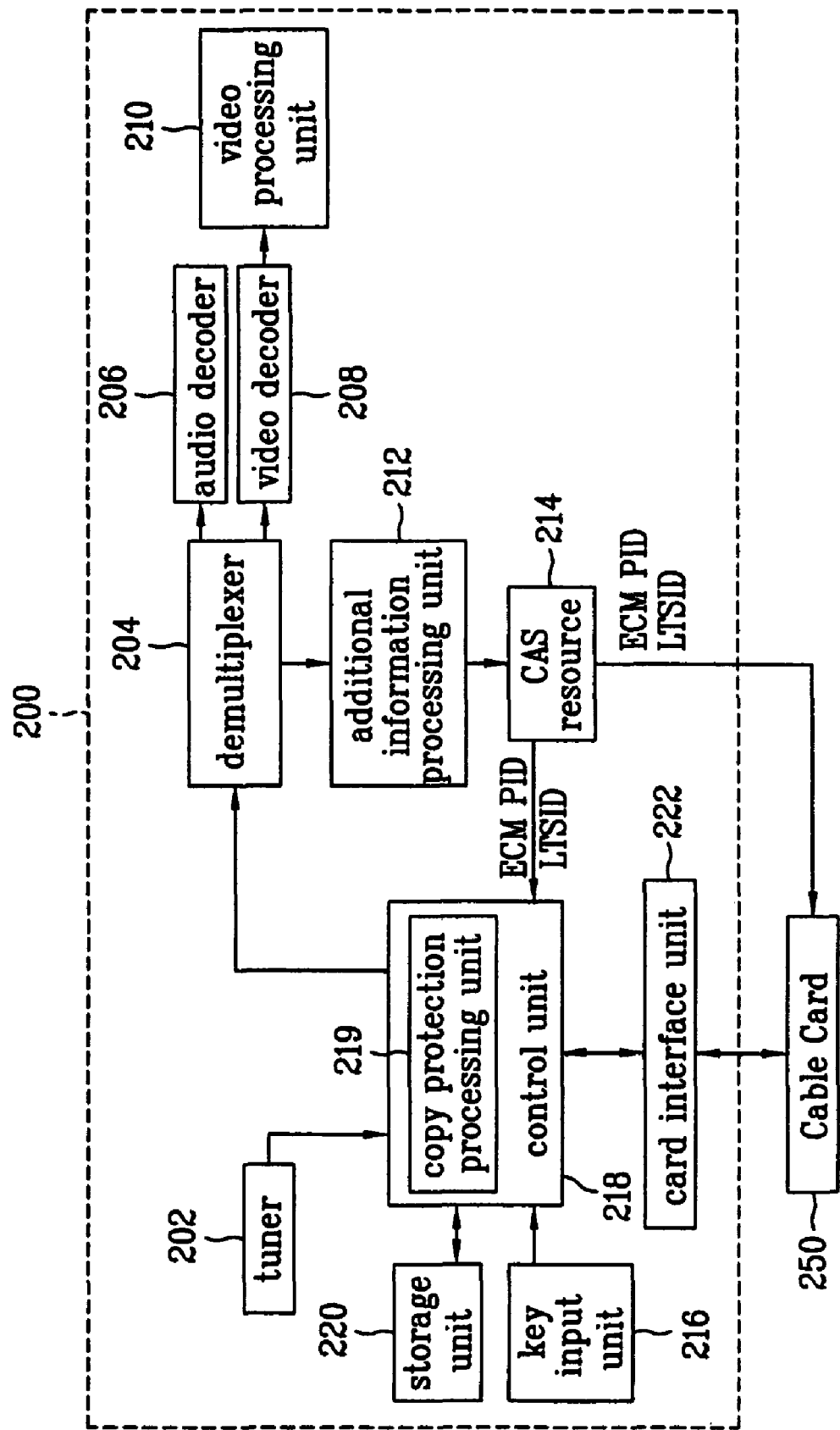
FIG. 2 is a block diagram of an exemplary digital broadcast receiver according to one embodiment of the present invention.

FIG. 2 is a block diagram of an exemplary digital broadcast receiver 200, which may be used as a host, according to one embodiment of the present invention, in which a conditional access is carried out by controlling each stream in case of multi-stream contents. Referring to FIG. 2, the digital broadcast receiver 200 may include a tuner 202, a demultiplexer 204, an audio decoder 206, a video decoder 208, a video processing unit 210, an additional information processing unit 212, a CAS resource unit 214, a key input unit 216, a control unit 218 including a copy protection processing unit 219, a storage unit 220, and a card interface unit 222. The control unit 218 controls the overall operation of the digital broadcast receiver 200. The storage unit 220 stores and extracts necessary information according to a control signal of the control unit 218. A cable card 250 is interfaced with the card interface unit 222.

The tuner 202 may be tuned to a channel selected by the user via the key input unit 216. The tuner tunes and filters to the selected broadcast signal, which is demodulated by a demodulator (not shown) in order to extract a content from the signal. If the content is not scrambled, then the content is forwarded to the demultiplexer 204. The demultiplexer 204 demultiplexes a video signal, an audio signal and an additional information signal, which may be time-multiplexed, from the content.

The audio decoder 206 may decode the audio signal, which is usually compressed and encoded, to its original form and forward it to a speaker (not shown). The video decoder 208 may decode the video signal, which may also be compressed and encoded, to its original form. The decoded video signal may be forwarded to the video processing unit 210, which converts the video signal to a format suitable for display on a screen, for example.

In the case, the content is scrambled, the additional information signal is forwarded to the additional information processing unit 212, which analyzes the signal. The information analyzed by the additional information processing unit 212 is forwarded to the CAS resource unit 214, which extracts ECM PID and LTSID from the analyzed information. The CAS resource unit 214 then forwards the extracted ECM PID and LTSID to the cable card 250 and the copy protection processing unit 219.

The cable card 250 and the copy protection processing unit 219 may create DES key(s) using the received ECM PID and LTSID and then perform a scramble/descramble of contents using the created key.

The DES key may be created using Formula 1:

$$\text{DES Key} = \text{CPKey} \oplus m \quad \text{[Formula 1]}$$

In this case, '$\oplus$' means an exclusive OR operation. A value of 'm' is generated by performing a binary concatenation operation on ECM PID and LTSID. The CP Key is a previously created and stored key described above. Usually, the CP Key is periodically or randomly refreshed by the head end and the value of 'm' changes if the channel is changed.

A method for copy protection of contents broadcasted by a head end is now described. When the cable card 250 is interfaced with the card interface unit 222, the digital broadcast receiver 200 and the cable card 250 performs mutual authentication. If the authentication process result indicates that the digital broadcast receiver 200 and the cable card 250 are valid, the digital broadcast receiver 200 creates a CP key. The created CP key of the digital broadcast receiver 200 may be identical to that created by the cable card 250. The created CP keys are stored in the digital broadcast receiver 200 and the cable card 250, respectively.

Contents transmitted from the head end is received by the digital broadcast receiver 200 and forwarded to the cable card 250. The cable card 250 decides a presence or non-presence of copy protection using copy control information (CCI) contained in a received content. Specifically, the cable card 250 decides the presence or non-presence of the copy protection using an EMI value within the CCI. If a value of the EMI is '00', it means copy is allowed. If a value of the EMI is '01', it means further copy is prohibited. If a value of the EMI is '10', it means copy is allowed only once. If a value of the EMI is '11', it means copy is not allowed.

Based on the EMI value, the cable card 250 may descramble content, if scrambled, using the secret key provided by the head end. The cable card 250 then re-scrambles the content using the created TDES key, which is created using the ECM PID and LTSID forwarded from the CAS resource unit 214 and the previously stored CP key. The cable card 250 then forwards the re-scrambled content to the digital broadcast receiver 200.

If the content is multi-stream, the cable card 250 re-scrambles the content according to the TDES algorithm using the TDES key. The TDES algorithm performs encryption by calculating two DES keys.

$$\text{DES KeyAm} = \text{CPKeyA} \oplus m \text{ where, } \oplus \text{ is exclusive OR}$$

$$\text{DES KeyBm} = \text{CPKeyB} \oplus m \text{ where, } \oplus \text{ is exclusive OR}$$

The content re-scrambled in the above manner is forwarded to the copy protection processing unit 219 of the digital broadcast receiver 200.

Figure 3:
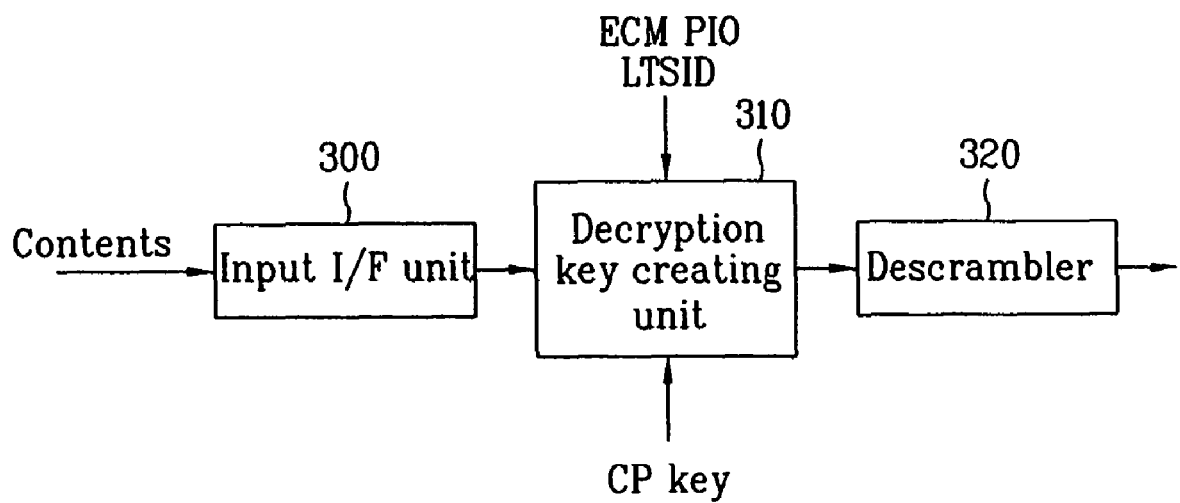
FIG. 3 is a detailed block diagram of the exemplary copy protection processing unit shown in FIG. 2.

FIG. 3 is a detailed block diagram of the copy protection processing unit 219 shown in FIG. 2. As shown in FIG. 3, the copy protection processing unit 219 may include an input interface unit 300, a decryption key generating unit 310 and a descrambler 320. The input interface unit 300 may receive one or more contents forwarded by the cable card 250. The decryption key creating unit 310, which stores the CP key created during cable card 250 authentication or the CP key refresh, creates a DES key using Formula 1 using the ECM PID and LTSID received from the CAS resource unit 214.

If contents received at the input interface unit 300 of the copy protection processing unit 219 are not scrambled, then the copy protection processing unit 219 forwards the contents to the demultiplexer 204. Otherwise, the input interface unit 300 forwards the scrambled contents to the descrambler 320. The descrambler 320 descrambles the contents according to the TDES algorithm using the DES key created by the decryption key creating unit 310. In particular, in descrambling the scrambled contents, the descrambler 320 descrambles the contents using TDES algorithm in case of multi-stream. In the TDES algorithm, decryption is performed by calculating three keys (k1, k2, k3). In the present embodiment, however, decryption may be achieved using two keys (k1, k2) where k1 may be substituted for k3. Where a content is multi-stream, the following two DES keys (i.e., TDES key) are created. And, the descramble is performed according to TDES algorithm using these DES keys.

DES KeyAm=CPKeyA$\otimes$ m where, $\otimes$ is exclusive OR

DES KeyBm=CPKeyB$\otimes$ m where, $\otimes$ is exclusive OR

Referring back to FIG. 2, the cable card 250 may perform a CP key refresh at predetermined time intervals or randomly. If the CP key refresh is performed at predetermined time intervals, the cable card 250 may refresh the CP key at 9 second intervals in case of an S-mode and at 28 second intervals in case of an M-mode.

If a new CP key is created by the refresh, the cable card 250 may forward the newly created CP key to the digital broadcast receiver 200. If so, the newly created CP keys are stored in the respective digital broadcast receiver 200 and the cable card 250.

If the new CP key is created by the refresh, the cable card 250 and the copy protection processing unit 219 of the digital broadcast receiver 200 create a new DES key using the newly created CP key. The cable card 250 and the copy protection processing unit 219 scramble or descramble a content using the newly created DES key. In particular, the cable card 250 and the copy protection processing unit 219 may create two DES keys (i.e., TDES key) using the newly created CP key and then scramble or descramble the corresponding contents according to the TDES algorithm using the two created DES keys (i.e., TDES key).

If a channel switch is received during a period before the CP key refresh, the cable card 250 and the digital broadcast receiver 200 create a DES key based on existing CP key prior to the CP key refresh.

If the channel switch is received after the CP key refresh period in which a new CP key is created, the cable card 250 and the digital broadcast receiver 200 create a DES key using the newly created CP key.

However, if the channel switch is received during the CP key refresh, The value of "m" is changed while the CP key is being refreshed. Thus, there is a chance that the cable card 250 and the digital broadcast receiver 200 may create a scramble key and a descramble key that to not correspond with each other. Therefore, a content scrambled by the cable card 250 may not be descrambled by the digital broadcast receiver 200.

In accordance with an embodiment of the present invention, the copy protection processing unit 219 may be able to generate a DES key that corresponds with a DES key generated by the cable card 250. In particular, if the channel is changed while the CP key is being refreshed internally carried out between the cable card 250 and the digital broadcast receiver 200, the value of 'm' is changed. In this case, since 'CP key' and 'm' simultaneously have new values from old values, respectively, the cable card 250 and the digital broadcast receiver 200 can create corresponding TDES Keys by using the same 'CP key' and 'm' only. In other words, the 'm' value changed by the channel change is used or the 'm' value prior to the change is used until the refresh of the CP key is completed. In this case, the CP key prior to the refresh is used by the cable card 250 and the digital broadcast receiver 200.

If 'm' is changed as the channel is changed in the course of the CP key refresh, TDES key is calculated after the CP key refresh in a manner of selecting a new 'm' value after the channel change by discarding the old 'm' value. Alternatively, the calculation is executed using the 'm' value prior to the change even if the 'm' value is changed.

This prevents a situation where the digital broadcast receiver 200 is unable to output a content since the cable card and the digital broadcast receiver generate a scramble key and a descramble key that are different during CP key refresh. In another embodiment, if the channel switches during CP key refresh period, the cable card 250 is prevented from scrambling the content and/or the digital broadcast receiver 200 is prevented from descrambling the content during the remainder of the CP key refresh period.

Figure 4:
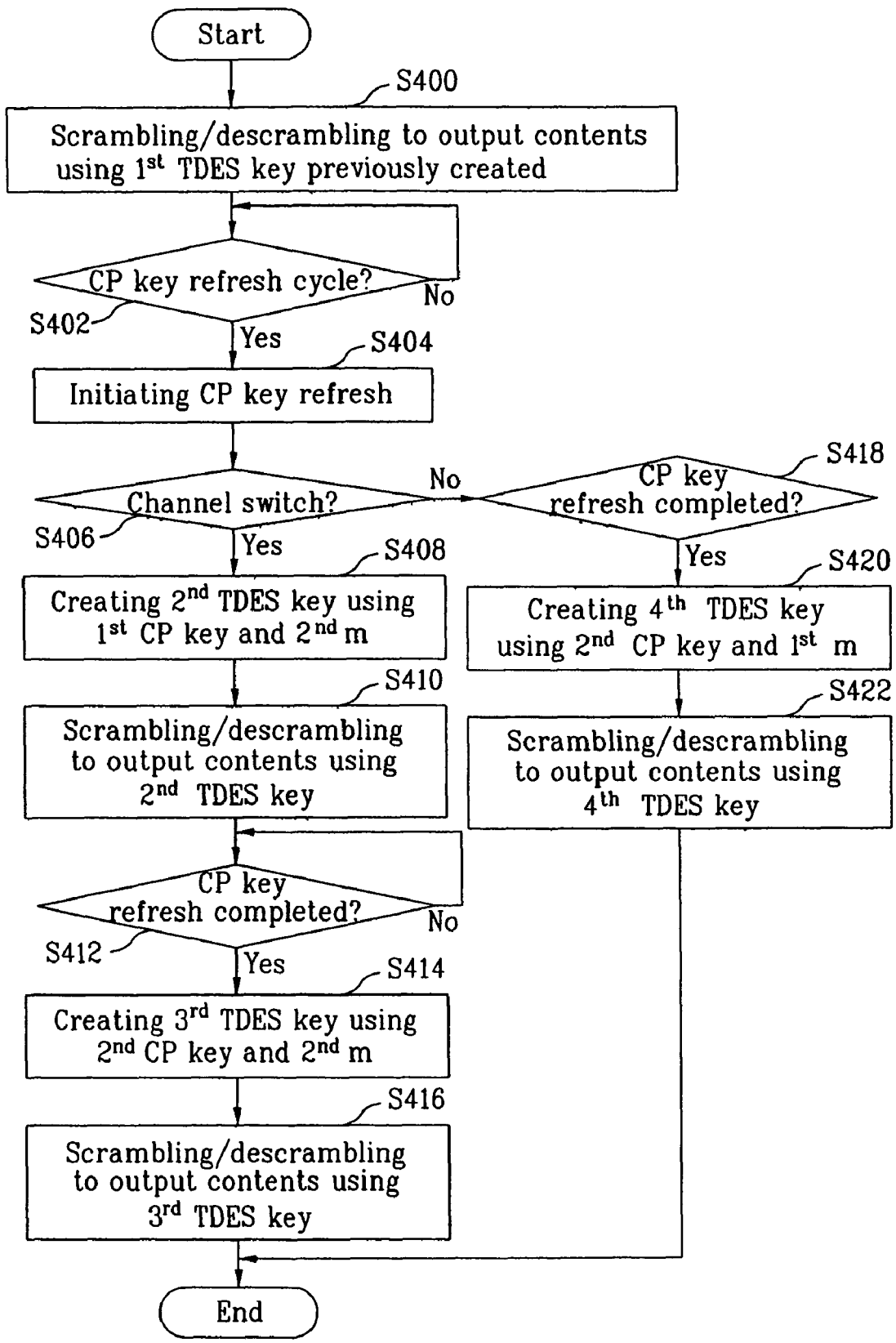
FIG. 4 is an exemplary flowchart of a copy protection method according to one embodiment of the present invention.
Figure 5A:
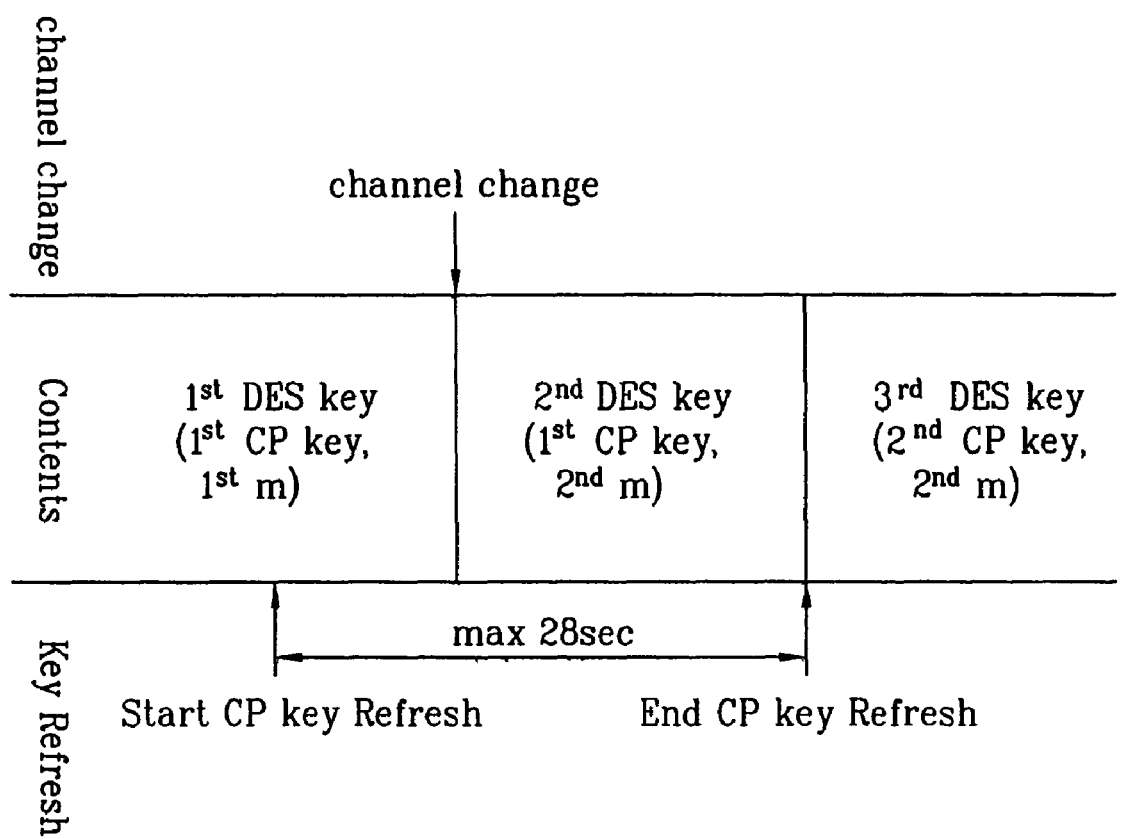
FIG. 5A and FIG. 5B are diagrams for further explaining the exemplary flowchart shown in FIG. 4.
Figure 5B:
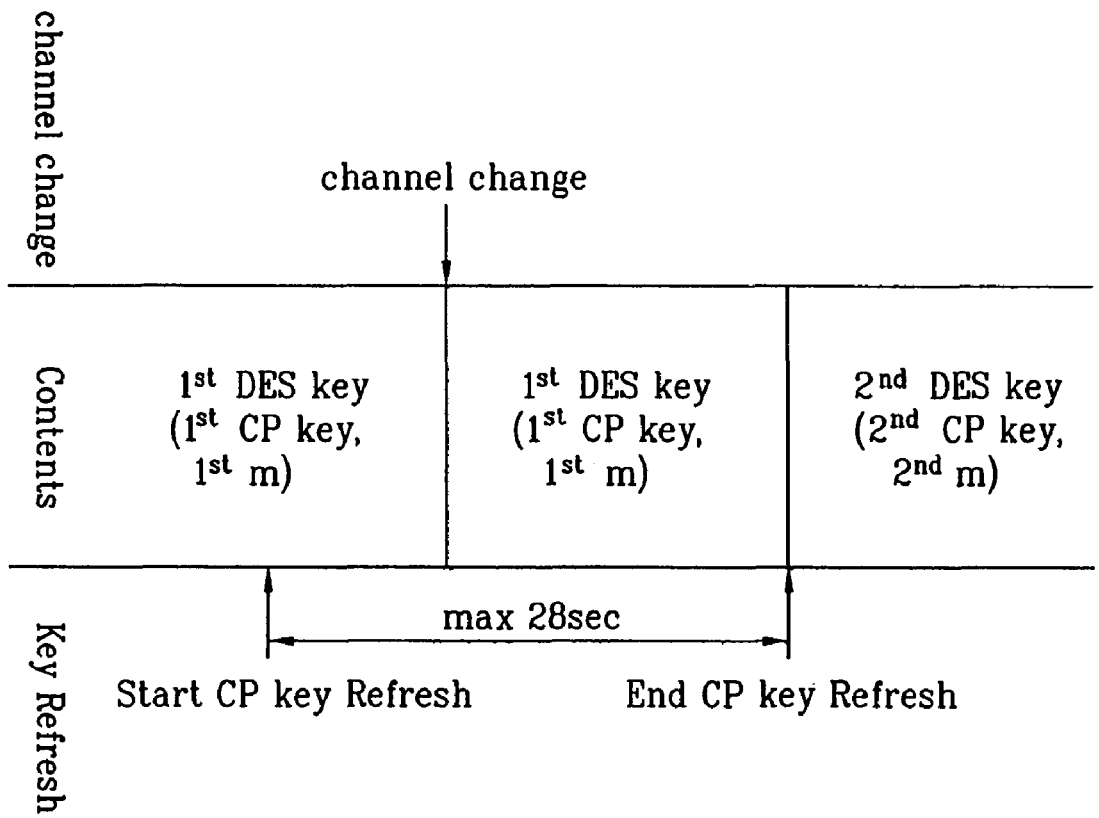

FIG. 4 is an exemplary flowchart of a copy protection method according to one embodiment of the present invention, where that a channel is switched at or during a period of CP key refresh. FIG. 5A and FIG. 5B are detailed diagrams to aid in the explanation of the embodiment shown in FIG. 4. In the following description, the contents may be multi-stream. The process described in the flowchart may be performed by one or more controllers.

Referring now to FIG. 4, at step S400, a content is scrambled or descrambled using a first TDES key that was previously created. Specifically, the first TDES key may include a DES keyA created according to a first CP keyA and a first 'm' value and a DES keyB created according to a first CP keyB and the first 'm' value. Accordingly, the content is scrambled or descrambled according to TDES algorithm using the two created DES keys (i.e., the first TDES key including the DES keyA and the DES keyB).

Then at step S402, a determination is made whether it is a CP key refresh cycle. If a CP key refresh is initiated according to the CP key refresh cycle, then the process continues to step S404, where the CP key refresh is performed. The process continues to step S406. At step S406, a determination is made whether a channel has been switched during CP key refresh cycle. If the channel has been switched during CP key refresh cycle, then a second TDES key using a first CP key and a new 'm' value (second 'm' value) is generated. Then, at step S410, the content is scrambled or descrambled using the created second TDES key. In this case, the second TDES key can include a DES keyC created according to a first CP keyA and a second 'm' value and a DES keyD created according to a second CP keyB and the second 'm' value. Thus, the content may be scrambled or descrambled according to the TDES algorithm using the two created DES keys (i.e., the second TDES key including the DES keyC and the DES keyD).

The process continues to step S412. At step S412, a determination is made whether the CP key refresh cycle has been completed after the second TDES key has been generated. If the CP key refresh cycle has been completed, the process continues to step S414 where a third TDES key value is generated using a new CP key (second CP key) created during the CP key refresh cycle and the second 'm' value. In particular, if the CP key refresh is completed, a new CP key value is generated. Hence, the third TDES key is generated using the generated second CP key value and the second 'm' value.

The process continues to step S416, where the content is scrambled or descrambled using the created third TDES key. In this case, the third TDES key can include a DES keyE created according to second CP keyA and a second 'm' value and a DES keyF created according to a second CP keyB and the second 'm' value. Thus, the content may be scrambled or descrambled according to the TDES algorithm using the two created DES keys (i.e., the third TDES key including the DES keyE and the DES keyF).

Otherwise, at step S406, if the channel has not been changed, the process continues to step S418. At step S418, a determination is made whether the CP key refresh cycle has been completed. If the CP key refresh cycle has been completed, the process continues to step S420. At step S420, a fourth TDES key is generated using the second CP key and the first 'm'.

The process then continues to step S422, where the content is scrambled or descrambled using the created fourth TDES key.

The DES key, which corresponds to a case that a channel switch takes place in the course of a CP key refresh cycle, as described with respect to step S406, will now be further explained with reference to FIG. 5A and FIG. 5B.

Referring to FIG. 5A, a first DES key is created using a first CP key value and a first 'm' value prior to a CP key refresh cycle. If a channel switch occurs in the course of performing the CP key refresh, a second DES key is created by the application of the first CP key value and a second 'm' value. In particular, if a channel is switched, a new 'm' value is generated since ECM PID and LTSID for a broadcast signal of the switched channel is changed.

So, a second DES key is created using the first CP key value and the second 'm' value and used from the time the channel is switched to the time the CP key refresh cycle ends.

If the CP key refresh cycle ends, a third DES key is created using a newly generated second CP key value and the second 'm' value.

Referring to FIG. 5B, a first DES key is created using a first CP key value and a first 'm' value prior to a CP key refresh cycle. If a channel switch occurs in the course of performing the CP key refresh cycle, a first DES key is created with the first CP key value corresponding to a value prior to the CP key refresh cycle and the first 'm' value. After the CP key refreshed has ended, a second DES key is created with a second CP key value created during the CP key refresh cycle and a second value "m" corresponding to the channel switching.

Figure 6:
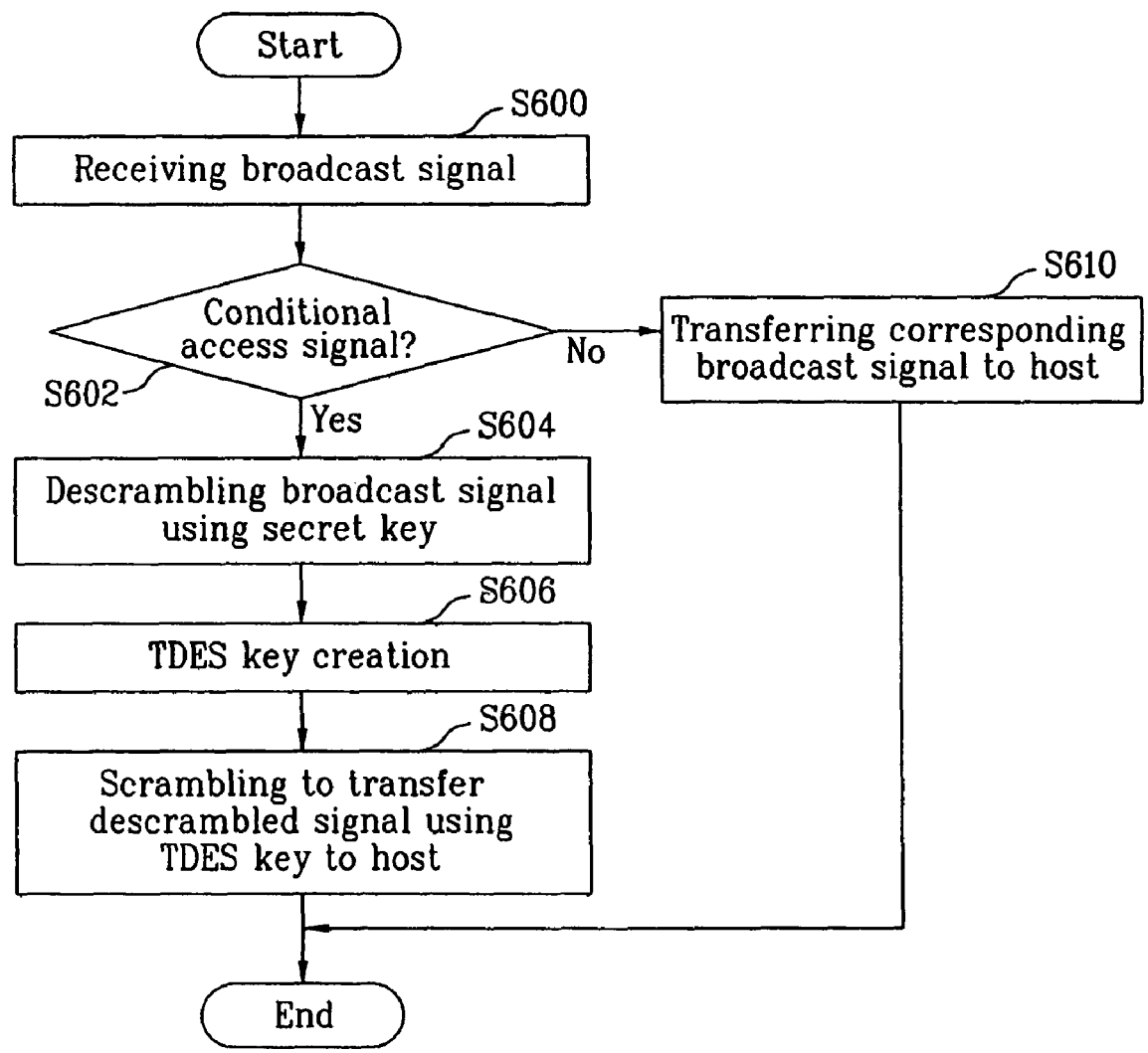
FIG. 6 is an exemplary flowchart of a copy protection method in a cable card according to one embodiment of the present invention.

FIG. 6 is an exemplary flowchart of a copy protection method of a content in a cable card according to one embodiment of the present invention. The process of the flow chart may be performed by a controller in the cable card.

Referring now to FIG. 6, at step S600, if a content is received, the process continues to step S602. At step S602, the cable card determines whether the received content is subject to conditional access. If the content is subject to conditional access, the process continues to step S604, where the cable card descrambles the content using a secret key provided by the head end. The process continues to step S606 where the cable card creates a TDES key for a copy protection of the descrambled content. Then, at step S608, the cable card re-scrambles the descrambled content using the created TDES key and then forwards the re-scrambled content to a host. Otherwise, if at step S602, if the content is not subject to conditional access, then the process continues to step S610, where the cable card forwards the content to the host.

Figure 7:
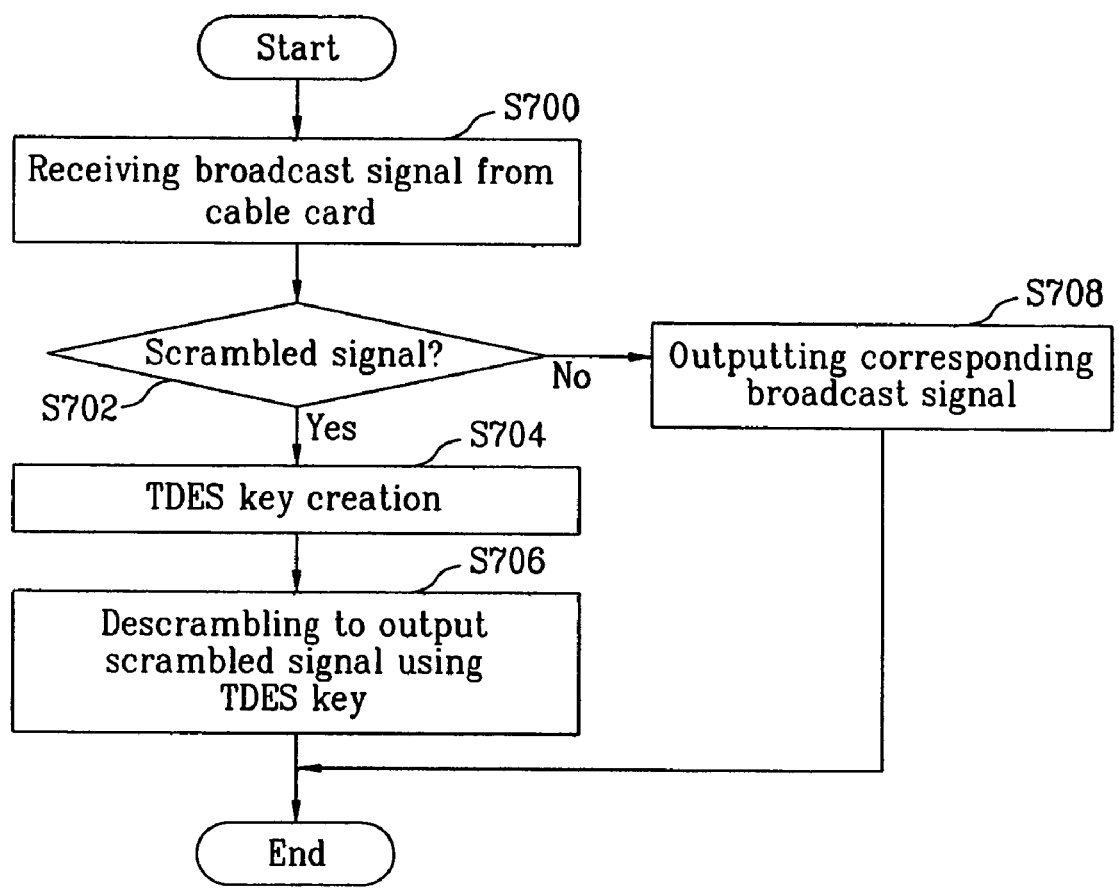
FIG. 7 is an exemplary flowchart of a copy protection method in a host according to one embodiment of present invention.

FIG. 7 is an exemplary flowchart of a method of outputting a content from a host according to one embodiment of the present invention. The process of the flowchart may be performed by a controller within the host.

Referring to FIG. 7, at step S700, when a content is received, the process continues to step S702, where the host determines whether the received content is scrambled. If the content is scrambled, then the process continues to step S704. At step S704, the host creates a TDES key. Then, at step S706, the host descrambles the scrambled content using the created TDES key.

Otherwise, if at step S702, if the content is not scrambled, then the process continues to step S708 where the host decodes the content, if necessary, for output.

Accordingly, the following advantages may be obtained.

Since TDES key factors for descrambling the scrambled contents can be synchronized in a broadcast receiver supporting a multi-stream cable card, both of the cable card and the broadcast receiver are capable of scrambling/descrambling high-quality contents.

If a channel is switched in multi-stream, a TDES key capable of a multi-stream copy protection can be provided.

The present disclosure has been described using digital broadcast receivers in which the broadcast receivers may have terrestrial analog/digital channels, and cable analog/digital channels. With modifications known to those skilled in the art, the present disclosure can be implemented in any terrestrial wired (e.g., telephone) and wireless (e.g., cellular) networks and satellite networks.

It will be appreciated that, in various of the above-disclosed and other features and functions, or alternatives thereof, they may be implemented on a programmed microprocessor, a microcontroller, an integrated circuit element such as ASIC, PLD, PLA, FPGA, or PAL, or the like, a hardwired electronic or logic circuit, or a programmable logic device.

It will be appreciated that the described flow process or data structure can be implemented as a self-consistent sequence of computerized steps that lead to a desired result. These steps can be defined by and/or in one or more computer instructions stored in a computer-readable medium, or can be encompassed using a signal, or provided as software instructions to a processing device. These steps can be performed by a processor executing the instructions that define the steps. Further, the flow process can be performed by a processor executing one or more appropriate programs, by special purpose hardware designed to perform the method, or any combination of such hardware, firmware and software elements.

It will be appreciated that various of the above-disclosed and other features and functions, or alternatives thereof, may be desirably combined into many other different devices or applications. Also, various presently unforeseen or unanticipated alternatives, modifications, variations or improvements therein may be subsequently made by those skilled in the art, and are also intended to be encompassed by the following claims.

What is claimed is:

1. A method of descrambling a broadcast signal in a broadcast receiver, the method comprising:
generating a first Data Encryption System (DES) key from a first Copy Protection (CP) key and a first value in a DES key generator, the first value being generated from a Entitlement Control Message (ECM) Packet ID (PID) and a Local Transport Stream ID (LTSID) of a first broadcast signal received through a first broadcast channel;
descrambling the first broadcast signal in a descrambler using the first DES key prior to a broadcast channel change;

generating a second DES key from the first CP key and a second value in the DES key generator, the second value being generated from a ECM PID and a LTSID of a second broadcast signal received through a second broadcast channel; and descrambling the second broadcast signal in the descrambler using the second DES key during a CP key refresh and after the broadcast channel change.

2. The method of claim 1, further comprising:

generating a third DES key from a second CP key and the second value in the DES key generator, the second CP key being generated during the CP key refresh; and descrambling the second broadcast signal in the descrambler using the third DES key after the CP key fresh and after the broadcast channel change.

3. The method of claim 1, wherein generating the second DES key comprises performing an exclusive OR operation between the first CP key and the second value.

4. The method of claim 2, wherein generating the third DES key comprises performing an exclusive OR operation between the second CP key and the second value.

5. A broadcast receiver for descrambling a broadcast signal, comprising:

a Data Encryption System (DES) key generator configured to generate a first DES key from a first Copy Protection (CP) key and a first value, the first value being generated from a Entitlement Control Message (ECM) Packet ID (PID) and a Local Transport Stream ID (LTSID) of a first broadcast signal received through a first broadcast channel, wherein the DES key generator is further configured to generate a second DES key from the first CP key and a second value, the second value being generated from a ECM PID and a LTSID of a second broadcast signal received through a second broadcast channel; and a descrambler configured to descramble the first broadcast signal using the first DES key prior to a broadcast channel change, wherein the descrambler is further configured to descramble the second broadcast signal using the second DES key during the CP key refresh and after the broadcast channel change.

6. The broadcast receiver of claim 5, wherein the DES key generator is configured to generate the second DES key by performing an exclusive OR operation between the first CP key and the second value, and to generate the third DES key by performing an exclusive OR operation between the second CP key and the second value.

7. A method of descrambling a broadcast signal in a broadcast receiver, the method comprising:

generating a first Data Encryption System (DES) key from a first Copy Protection (CP) key and a first value in a DES key generator, the first value being generated from a Entitlement Control Message (ECM) Packet ID (PID) and a Local Transport Stream ID (LTSID) of a first broadcast signal received through a first broadcast channel;

descrambling the first broadcast signal in a descrambler using the first DES key prior to a broadcast channel change; and descrambling a second broadcast signal received through a second broadcast channel in the descrambler using the first DES key during a CP key refresh and after the broadcast channel change;

generating a second DES key from a second CP key and a second value in the DES key generator, the second value being generated from a ECM PID and a LTSID of the second broadcast signal, the second CP key being generated during the CP key refresh; and descrambling the second broadcast signal in the descrambler using the second DES key after the CP key refresh and after the broadcast channel change.

8. The method of claim 7, wherein generating the first DES key comprises the performing an exclusive OR operation between the first CP key and the first m value.

9. The method of claim 7, wherein generating the second DES key comprises performing an exclusive OR operation between the second CP key and the second value.

10. A broadcast receiver for descrambling a broadcast signal, comprising: a Data Encryption System (DES) key generator configured to generate a first DES key from a first Copy Protection (CP) key and a first value, the first value being generated from a Entitlement Control Message (ECM) Packet ID (PID) and a Local Transport Stream ID (LTSID) of a first broadcast signal received through a first broadcast channel; and a descrambler configured to descramble the first broadcast signal using the first DES key prior to a broadcast channel change;

the descrambler is configured to descramble a second broadcast signal using the first DES key during the CP key refresh and after the broadcast channel change;

the DES key generator configured to generate a second DES key from the second CP key and a second value in the DES key generator, the second value being generated from a ECM PID and a LTSID of the second broadcast signal, the second CP key being generated during the CP key refresh; and the descrambler is configured to descramble the second broadcast signal in the descrambler using the second DES key after the CP key refresh and after the broadcast channel change.

11. The broadcast receiver of claim 10, wherein the DES key generator is configured to generate the second DES key by performing an exclusive OR operation between a second CP key and a second value.

* * * * *